(12) United States Patent
Kitakata (10) Patent No.: US 10,576,920 B2
(45) Date of Patent: Mar. 3, 2020

(54) VEHICLE BODY STRUCTURE

(71) Applicant: TOYOTA JIDOSHA KABUSHIKI KAISHA, Toyota-shi, Aichi-ken (JP)

(72) Inventor: Shintaro Kitakata, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 15/906,195

(22) Filed: Feb. 27, 2018

(65) Prior Publication Data

US 2018/0257586 A1    Sep. 13, 2018

(30) Foreign Application Priority Data

Mar. 7, 2017  (JP) ................. 2017-043103

(51) Int. Cl.
  *B60R 19/03*  (2006.01)
  *B60R 19/18*  (2006.01)
  *B60J 5/04*  (2006.01)

(52) U.S. Cl.
  CPC ............. *B60R 19/03* (2013.01); *B60J 5/0447* (2013.01); *B60J 5/0484* (2013.01); *B60R 19/18* (2013.01); *B60R 2019/182* (2013.01); *B60R 2019/186* (2013.01); *B60R 2019/1813* (2013.01); *B60R 2019/1853* (2013.01)

(58) Field of Classification Search
  CPC ........ B60R 2019/182; B60R 2019/186; B60R 2019/1813; B60R 2019/1853; B60R 19/18; B60R 19/03; B60J 5/0484; B60J 5/0447

USPC ........................................................ 293/102
See application file for complete search history.

(56) References Cited

U.S. PATENT DOCUMENTS

| 4,357,040 A * | 11/1982 | Tomioka ................. B60J 5/101 293/102 |
| 7,517,001 B1 * | 4/2009 | Goldbaum ............. B60R 13/04 296/126 |
| 2007/0210590 A1 | 9/2007 | Gouillart et al. |
| 2016/0288735 A1 | 10/2016 | Horner et al. |

FOREIGN PATENT DOCUMENTS

| DE | 102006011055 A1 | 9/2007 |
| DE | 102012008060 A1 | 10/2013 |
| JP | H11-210937 A | 8/1999 |
| JP | 2002-240658 A | 8/2002 |
| JP | 2004-217806 A | 8/2004 |
| JP | 2006-213312 A | 8/2006 |
| JP | 2006213312 A * | 8/2006 |
| JP | 2015-160524 A | 9/2015 |

* cited by examiner

*Primary Examiner* — Joseph D. Pape
*Assistant Examiner* — Dana D Ivey
(74) *Attorney, Agent, or Firm* — Oliff PLC (57) ABSTRACT

A vehicle body structure includes a reinforcing material layer formed of a fiber reinforced resin and a vehicle skeleton member having a closed sectional structure formed of metal. The reinforcing material layer is bonded to a surface of the vehicle skeleton member having a recessed portion recessed toward an inside of the closed sectional structure. An adhesive is disposed at least between the recessed portion and the reinforcing material layer.

18 Claims, 7 Drawing Sheets

VEHICLE BODY STRUCTURE

INCORPORATION BY REFERENCE

The disclosure of Japanese Patent Application No. 2017-043103 filed on Mar. 7, 2017 including the specification, drawings and abstract is incorporated herein by reference in its entirety.

BACKGROUND

1. Technical Field

The disclosure relates to a vehicle body structure.

2. Description of Related Art

Japanese Unexamined Patent Application Publication No. 2015-160524 (JP 2015-160524 A) discloses a B pillar (center pillar) that constitutes a part of a side door opening portion disposed in a side portion of a vehicle. The B pillar is formed by bonding an inner panel to an outer panel and has a hat shape in section. A carbon fiber reinforced plastic (CFRP)-based reinforcing material that has a sheet shape is bonded to the inner panel in the up-down direction of the vehicle. As a result, the flexural capacity of the entire B pillar including the reinforcing material is improved.

SUMMARY

In the case of the configuration that is disclosed in JP 2015-160524 A, however, the sheet-shaped reinforcing material is bonded to a planar-shaped adhesive surface of the inner panel, and thus the thickness of an adhesive decreases. Accordingly, the range in which the thickness of the adhesive is adjusted becomes narrow, and peeling of the reinforcing material from a vehicle skeleton member may occur at some parts of the vehicle skeleton member because a needed adhesive strength was not obtained. In other words, the reinforcing material may not work effectively and the flexural capacity of the entire vehicle skeleton member including the reinforcing material may decrease. Therefore, the related art has room for improvement in this regard.

The disclosure provides a vehicle body structure with which the flexural capacity of an entire vehicle skeleton member that includes a reinforcing material layer which reinforces the vehicle skeleton member can be improved.

A first aspect of the disclosure relates to a vehicle body structure including a vehicle skeleton member having a closed sectional structure and being formed of metal, a portion of an outer surface of the vehicle skeleton member having a recessed portion recessed toward an inside of the closed sectional structure, and a reinforcing material layer formed of a fiber reinforced resin and adhered to at least the portion of the outer surface of the vehicle skeleton member having the recessed portion. An adhesive is disposed at least between the recessed portion and the reinforcing Material layer to adhere the reinforcing material layer to at least the portion of the outer surface of the vehicle skeleton member having the recessed portion.

According to the first aspect, the reinforcing material layer formed of the fiber reinforced resin is bonded to the vehicle skeleton member having the closed sectional structure and formed of metal. The recessed portion is formed at a portion of an outer surface of the vehicle skeleton member to which the reinforcing material layer is bonded, the recessed portion being recessed toward the inside of the closed sectional structure of the vehicle skeleton member, and the adhesive is disposed at least between the recessed portion and the reinforcing material layer. Accordingly, the thickness of the adhesive can be increased by the recessed portion, and thus peeling of the reinforcing material layer from the vehicle skeleton member can be suppressed. Therefore, the reinforcing material layer is capable of working effectively and the flexural capacity of the vehicle skeleton member including the reinforcing material layer can be improved.

According to the above aspect, an excellent effect can be achieved as the flexural capacity of the entire vehicle skeleton member that includes the reinforcing material layer which reinforces the vehicle skeleton member can be improved.

In the above aspect, the adhesive may fill the recessed portion.

According to the above aspect, the recessed portion is filled with the adhesive, and thus the thickness of the adhesive can be reliably increased in the recessed portion and peeling of the reinforcing material layer from the vehicle skeleton member can be suppressed. Accordingly, the reinforcing material layer is capable of working effectively and the flexural capacity of the vehicle skeleton member including the reinforcing material layer can be improved.

According to the above aspect, an excellent effect can be achieved as the flexural capacity of the entire vehicle skeleton member that includes the reinforcing material layer which reinforces the vehicle skeleton member can be improved.

In the above aspect, the adhesive may be partially disposed in the recessed portion.

In the vehicle body structure according to the above aspect, the vehicle skeleton member may be a bumper reinforcement extending in a width direction of a vehicle, and the recessed portion may be formed in a vehicle-inward-facing surface of the bumper reinforcement at least at vehicle-width-direction end portions of the bumper reinforcement.

According to the above aspect, the vehicle skeleton member is the bumper reinforcement extending in the width direction of the vehicle and the recessed portion is formed in the vehicle-inward-facing surface of the bumper reinforcement at least at the vehicle-width-direction end portions of the bumper reinforcement. Accordingly, once a collision load is input to one vehicle-width-direction end portion of the bumper reinforcement by the vehicle undergoing an offset collision, the vehicle-width-direction end portion to which the collision load is input is deformed toward the rear side of the vehicle (if the bumper reinforcement is located at the front of the vehicle). In this case, the recessed portion formed in the vehicle-width-direction end portion of the bumper reinforcement is stretched into a planar shape (in the present specification, the "planar shape" also means a "substantially planar shape"), and thus the dimension of the outer surface having the recessed portion is enlarged in the in-plane direction and breaking of the bumper reinforcement as well as breaking of the outer surface can be suppressed. Therefore, the collision load can be transmitted to the bumper reinforcement on the end not undergoing the offset collision as well, and thus the collision load can be absorbed by the vehicle as a whole.

According to the above aspect, an excellent effect can be achieved as a collision load at a time of an offset collision can be effectively absorbed.

In the above aspect, the vehicle skeleton member may be a vehicle pillar extending in an up-down direction of the vehicle (in the present specification, the "up-down direction of the vehicle" also means a "substantially up-down direction of the vehicle").

According to the above aspect, the vehicle skeleton member is the vehicle pillar extending in the up-down direction of the vehicle. Accordingly, the vehicle pillar is deformed toward the inner side in the width direction of the vehicle once a collision load is input to the vehicle pillar during a vehicle side collision. In this case, the recessed portion is stretched into a substantially planar shape, and thus the dimension of the surface having the recessed portion is enlarged in the in-plane direction and breaking of the vehicle pillar as well as breaking of the surface can be suppressed. Therefore, the collision load can be absorbed by the vehicle pillar.

In the above aspect, the vehicle skeleton member may be a rocker extending in a front-rear direction of the vehicle (in the present specification, the "front-rear direction of the vehicle" also means a "substantially front-rear direction of the vehicle").

According to the above aspect, the vehicle skeleton member is the rocker extending in the front-rear direction of the vehicle. Accordingly, the rocker is deformed toward the inner side in the width direction of the vehicle once a collision load is input to the rocker during a vehicle side collision. In this case, the recessed portion is stretched into a substantially planar shape, and thus the dimension of the surface having the recessed portion is enlarged in the in-plane direction and breaking of the rocker as well as breaking of the surface can be suppressed. Therefore, the collision load can be absorbed by the rocker.

According to the above, an excellent effect can be achieved as a collision load can be effectively absorbed during a vehicle side collision.

In the above aspect, the vehicle skeleton member is elongated in a first direction, the portion of the outer surface of the vehicle skeleton member having the recessed portion extends in the first direction and has first and second end portions disposed adjacent to each other in a direction orthogonal to the first direction, the recessed portion may have a plurality of first recessed portions formed along the first end portion and a plurality of second recessed portions formed along the second end portion, and the first recessed portions and the second recessed portions may be alternately disposed relative to the first direction.

According to the above aspect, the recessed portion has the first recessed portions and the second recessed portions that are alternately disposed. Accordingly, at any position amongst the recessed portions, the reinforcing material layer can be bonded to the vehicle skeleton member via at least one of the first recessed portions and the second recessed portions where the thickness of the adhesive is increased.

"Alternately" means that each second recessed portion is disposed at the part of the outer surface corresponding to the space between adjacent first recessed portions, and each first recessed portion is disposed at the part of the outer surface corresponding to the space between adjacent second recessed portions.

In the above aspect, the first recessed portions may be disposed at a predetermined pitch and the second recessed portions may be disposed at a pitch differing from the predetermined pitch of the first recessed portions.

According to the above aspect, the first recessed portions are disposed at the predetermined pitch and the second recessed portions are disposed at the pitch differing from the predetermined pitch of the first recessed portions. Accordingly, the first recessed portions and the second recessed portions can be alternately disposed even in a case where the size of the first recessed portions and the size of the second recessed portions differ from each other. Therefore, at any position amongst the recessed portions, the reinforcing material layer can be bonded to the vehicle skeleton member via at least one of the first recessed portions and the second recessed portions where the thickness of the adhesive is increased.

In the above aspect, the portion of the outer surface of the vehicle skeleton member having the recessed portion may be disposed on a vehicle-inner-side-facing surface of the vehicle skeleton member and the reinforcing material layer may be bonded to the portion of the outer surface from an inner side of the vehicle.

According to the above aspect, the outer surface of the vehicle skeleton member having the recessed portion is disposed on the vehicle-inner-side-facing surface of the vehicle skeleton member and the reinforcing material layer is bonded to the portion of the outer surface from the inner side of the vehicle. Accordingly, even in a case where a tensile force acts on the vehicle-inner-side-facing surface of the vehicle skeleton member by a collision load directed from the outer side of the vehicle toward the inner side of the vehicle being input to the vehicle skeleton member during a collision of the vehicle, breaking of the vehicle-inner-side-facing surface of the vehicle skeleton member can be suppressed by the reinforcing material layer, which is a high-rigidity member formed of a fiber reinforced resin.

In the vehicle body structure according to the above aspect, fibers of the fiber reinforced resin forming the reinforcing material layer may extend in directions intersecting with each other.

According to the above aspect, the fibers of the fiber reinforced resin forming the reinforcing material layer extend in the directions intersecting with each other, and thus the flexural rigidity of the fiber reinforced resin with respect to inputs from various directions is improved. Accordingly, the flexural rigidity of the vehicle skeleton member to which the reinforcing material layer formed of the fiber reinforced resin is bonded is improved with respect to inputs from various directions, and thus sectional deformation can be suppressed.

According to the above aspect, an excellent effect can be achieved as the flexural capacity of the entire vehicle skeleton member that includes the reinforcing material layer which reinforces the vehicle skeleton member can be improved.

In the above aspect, a depth of the recessed portion may be at least a deformation amount of the portion of the outer surface of the vehicle skeleton member having the recessed portion in a direction perpendicular to the outer surface that is attributable to a thermal distortion of the vehicle skeleton member.

According to the above aspect, the depth of the recessed portion is at least the deformation amount of the portion of the outer surface of the vehicle skeleton member having the recessed portion in the direction perpendicular to the outer surface that is attributable to the thermal distortion of the vehicle skeleton member, and thus the recessed portion is maintained even in a case where the vehicle skeleton member is deformed by the thermal distortion to the reinforcing material layer side along the direction perpendicular to the outer surface. Accordingly, the place where the adhesive has a large thickness can be maintained.

According to the above aspect, an excellent effect can be achieved as the effect of the thermal distortion on the adhesive strength of the reinforcing material layer toward the vehicle skeleton member can be reduced.

In the above aspect, a depth of the recessed portion may be 5 mm or less,

According to the above aspect, the depth of the recessed portion is 5 mm or less. Accordingly, a decline in the adhesive strength of the adhesive attributable to an excessively thick adhesive layer can be suppressed.

According to the above aspect of the disclosure, an excellent effect can be achieved as a decline in the adhesive strength between the reinforcing material layer and the vehicle skeleton member can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a vehicle body structure according to an aspect of the disclosure will be described with reference to FIGS. 1 to 6. The arrows FR, OUT, and UP that are illustrated in FIGS. 1 to 6 represent the front side of a vehicle in its front-rear direction, the outside in the width direction of the vehicle, and the upper side in the up-down direction of the vehicle, respectively.

Figure 1:
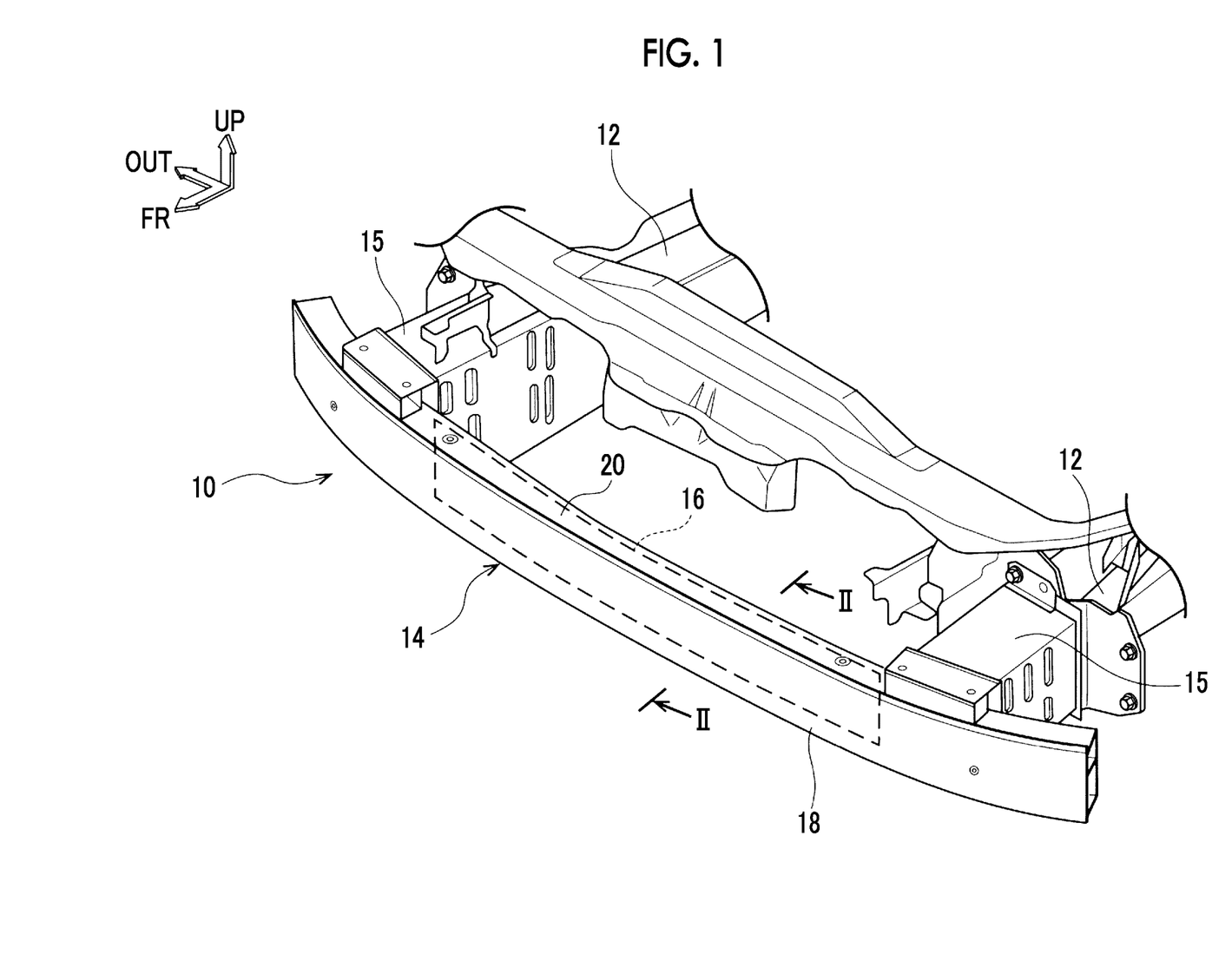
FIG. 1 is a perspective view illustrating a state where a front bumper reinforcement having a vehicle body structure according to a first embodiment is seen from the front side of a vehicle.

As illustrated in FIG. 1, a front bumper reinforcement (hereinafter, referred to as a "bumper R/F") 14 as a vehicle skeleton member and a reinforcing material 16 constitute a vehicle body structure 10 disposed in the front portion of the vehicle. The bumper R/F 14 is disposed on the front sides of a pair of front side members 12 in the width direction of the vehicle and is attached to the front side members 12 via crash boxes 15.

Figure 2:
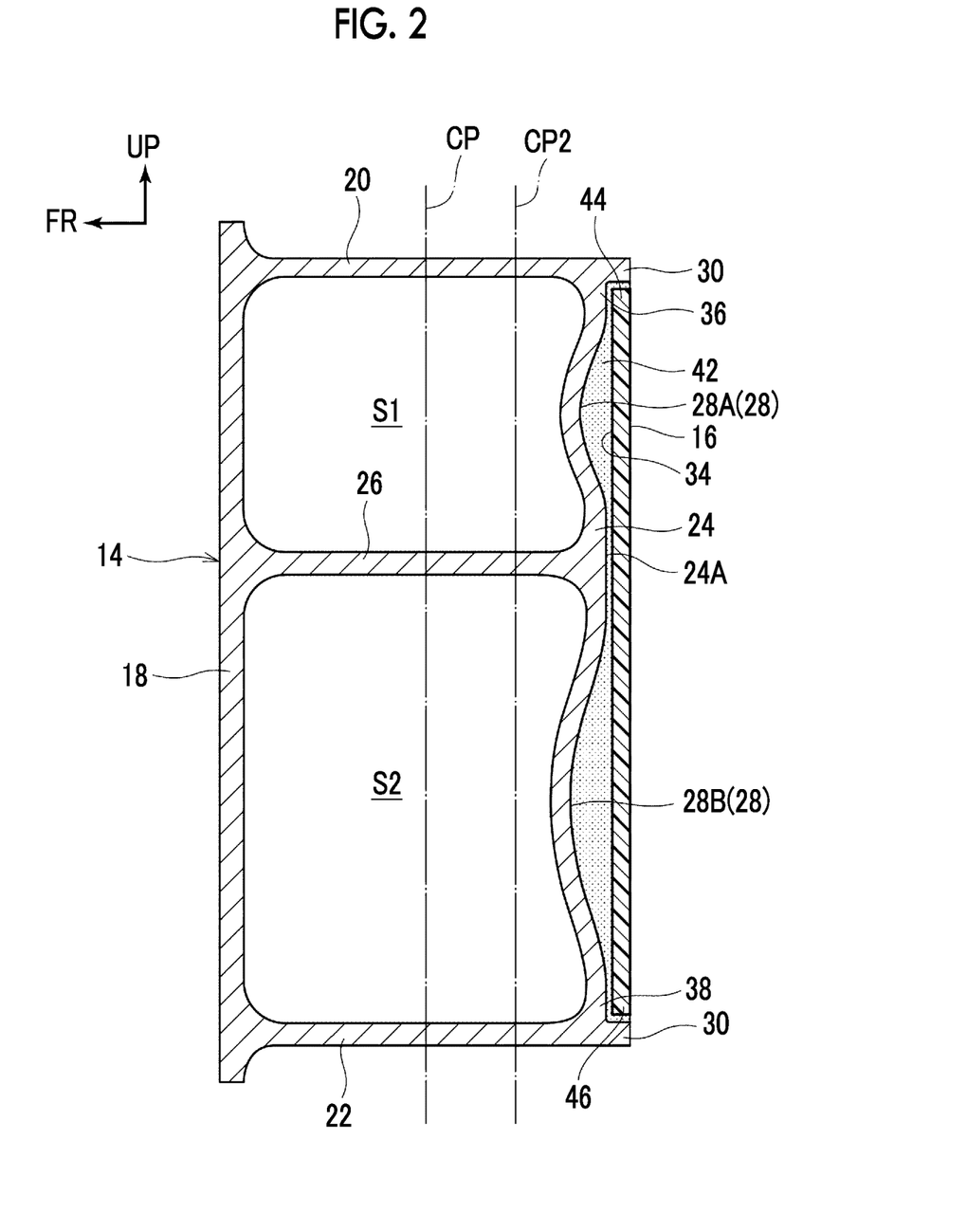
FIG. 2 is a cross-sectional view illustrating a state where the front bumper reinforcement is cut along line of FIG. 1.

The bumper R/F 14 is an extruded aluminum alloy material manufactured by extrusion molding or the like, and the bumper R/F 14 according to the present embodiment has a substantially ladder-shaped cross section in side view of the vehicle as illustrated in FIG. 2. Specifically, the bumper R/F 14 is provided with a rectangular front wall portion 18, an upper wall portion 20, and a lower wall portion 22. The front wall portion 18 extends in the front-rear direction of the vehicle as its thickness direction and in the width direction of the vehicle as its longitudinal direction. The upper wall portion 20 extends rearward from the upper end side part of the front wall portion 18. The lower wall portion 22 extends rearward from the lower end side part of the front wall portion 18. The bumper R/F 14 is also provided with a rear wall portion 24 connecting the rear end side part of the upper wall portion 20 and the rear end side part of the lower wall portion 22 to each other in the up-down direction. The bumper R/F 14 has a rectangular closed sectional structure that has the up-down direction of the vehicle as its longitudinal direction in side view of the vehicle by having the front wall portion 18, the upper wall portion 20, the lower wall portion 22, and the rear wall portion 24. That is the bumper R/F 14 is larger in the up-down direction than in the front-rear direction.

The bumper R/F 14 is also provided with a middle wall portion 26. The middle wall portion 26 connects the first wall portion 18 to the rear wall portion 24 in the front-rear direction at locations above the intermediate portion of the front wall portion 18 in the up-down direction of the vehicle and above the intermediate portion of the rear wall portion 24, The space that is closed by the front wall portion 18, the upper wall portion 20, the lower wall portion 22, and the rear wall portion 24 is divided in the up-down direction of the vehicle by the middle wall portion 26. A closed space S1 on the upper side of the vehicle is smaller in size than a closed space S2 on the lower side of the vehicle.

A pair of upper and lower end portion reinforcing portions (projections) 30 is provided such that the upper and lower end portion reinforcing portions 30 are respectively formed in both end portions of the rear wall portion 24 of the bumper R/F 14 in the up-down direction of the vehicle. The upper and lower end portion reinforcing portions 30 protrude to the rear side of the vehicle from the rear wall portion 24 along the direction that is perpendicular to the surface of the rear wall portion 24. The amounts by which the end portion reinforcing portions 30 protrude are set such that the amounts are substantially equal to each other. Specifically, the upper and lower end portion reinforcing portions 30 protrude to the rear side of the vehicle by a dimension that is slightly larger than the plate thickness of the reinforcing material 16 (described later). The plate thickness (dimension in the up-down direction of the vehicle) of the end portion reinforcing portion 30 is set to be substantially equal to the plate thicknesses of the upper wall portion 20 and the lower wall portion 22.

Figure 4A:
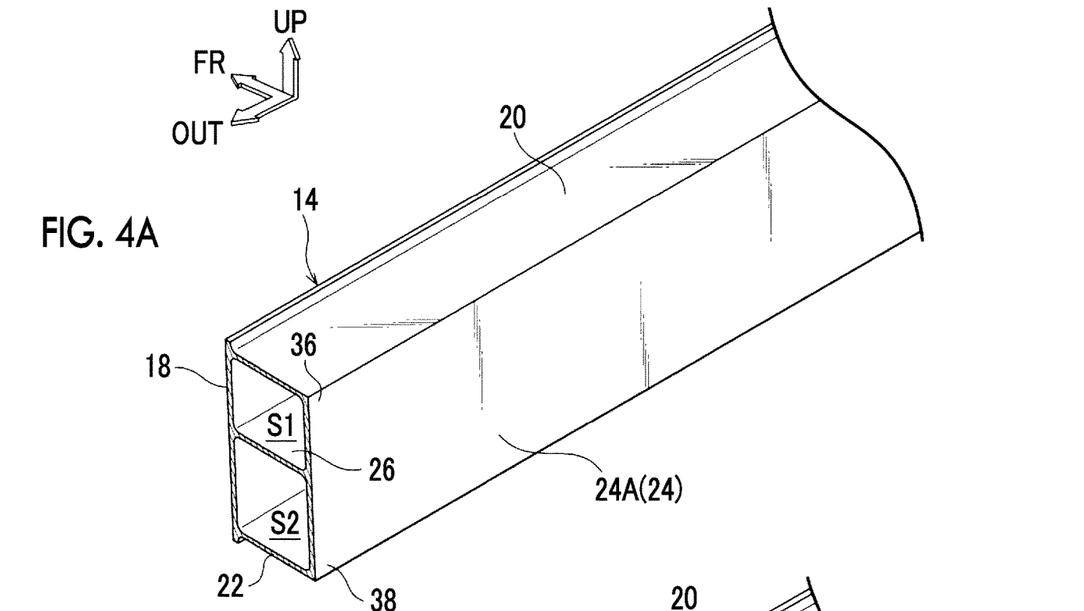
FIG. 4A is a perspective view illustrating a state where a recessed portion of the front bumper reinforcement having the vehicle body structure according to the first embodiment is yet to be formed.
Figure 4B:
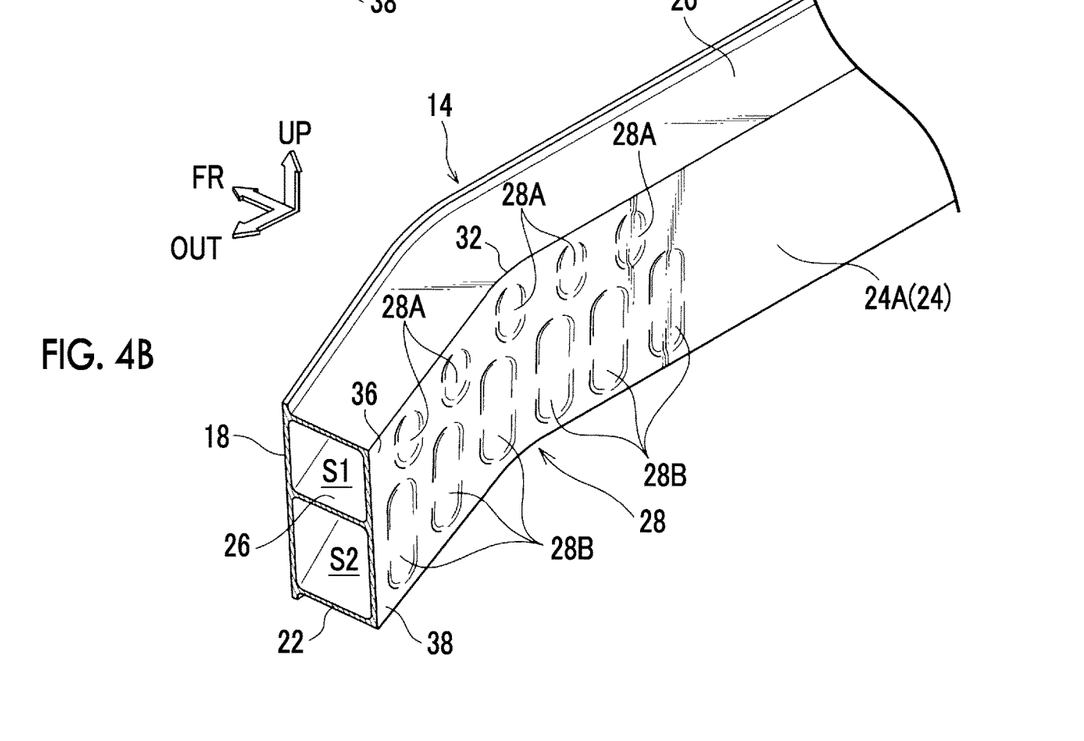
FIG. 4B is a perspective view illustrating a state where the recessed portion of the front bumper reinforcement having the vehicle body structure according to the first embodiment is formed.

The vehicle-inner-side surface of the bumper R/F 14, that is, the vehicle-rear-side surface of the rear wall portion 24 is an adhesive surface 24A. A recessed portion 28 is formed at a part of the adhesive surface 24A. As illustrated in FIG. 4B, the recessed portion 28 is formed in a vehicle-width-direction outer side portion of the bumper R/F 14. The vehicle-width-direction outer side portion of the bumper R/F 14 is inclined from a flexion starting point portion 32 toward the rear side of the vehicle in accordance with the design of the vehicle. A plurality of the recessed portions 28 is arranged in the width direction of the vehicle about the part of the adhesive surface 24A of the rear wall portion 24 of the bumper R/F 14 that corresponds to the flexion starting point portion 32. The recessed portion 28 is formed when the bumper R/F 14 is bent about the flexion starting point portion 32. Specifically, the bumper R/F 14 is bent about the flexion starting point portion 32 as a tensile force is applied along the longitudinal direction of the bumper R/F 14. The recessed portion 28 is formed as desired by controlling the tensile force.

The recessed portion 28 has a first recessed portion 28A and a second recessed portion 28B. The first recessed portion 28A has a substantially elliptical shape and is recessed toward the space S1 (that is, toward the side opposite to the reinforcing material 16) in front view of the vehicle (refer to FIG. 2). A plurality of the first recessed portions 28A is provided such that the first recessed portions 28A are disposed at a predetermined pitch along an end portion 36 on the upper side of the vehicle as a first end portion parallel to the extension direction of the adhesive surface 24A of the rear wall portion 24. The second recessed portion 28B has a substantially elliptical shape that has the up-down direction of the vehicle as its longitudinal direction and is recessed toward the space S2 (that is, toward the side opposite to the reinforcing material 16) in front view of the vehicle (refer to FIG. 2). A plurality of the second recessed portions 28B is provided such that the second recessed portions 28B are disposed at a pitch differing from the pitch of the first recessed portions 28A along an end portion 38 on the lower side of the vehicle as a second end portion on the side of the adhesive surface 24A of the rear wall portion 24 that is opposite to the end portion 36. The first recessed portion 28A and the second recessed portion 28B do not overlap each other in the up-down direction of the vehicle (as is clear from FIG. 2) and are disposed in a staggered shape (alternately) in front view of the vehicle (as is clear from FIG. 4B).

As illustrated in FIG. 2, the depth of the first recessed portion 28A with respect to the adhesive surface 24A is set between (i) 5 mm and (ii) the deformation amount of the adhesive surface 24A in the direction perpendicular to the surface that is attributable to a thermal distortion of the bumper R/F 14. As in the case of the first recessed portion 28A, the depth of the second recessed portion 28B with respect to the adhesive surface 24A is set between (i) 5 mm and (ii) the deformation amount of the adhesive surface 24A in the direction perpendicular to the surface that is attributable to a thermal distortion of the bumper R/F 14. Specifically, in the present embodiment, the depth of each of the first recessed portion 28A and the second recessed portion 2813 with. respect to the adhesive surface 24A is set within a range of 0.5 mm to 5 mm.

Figure 5:
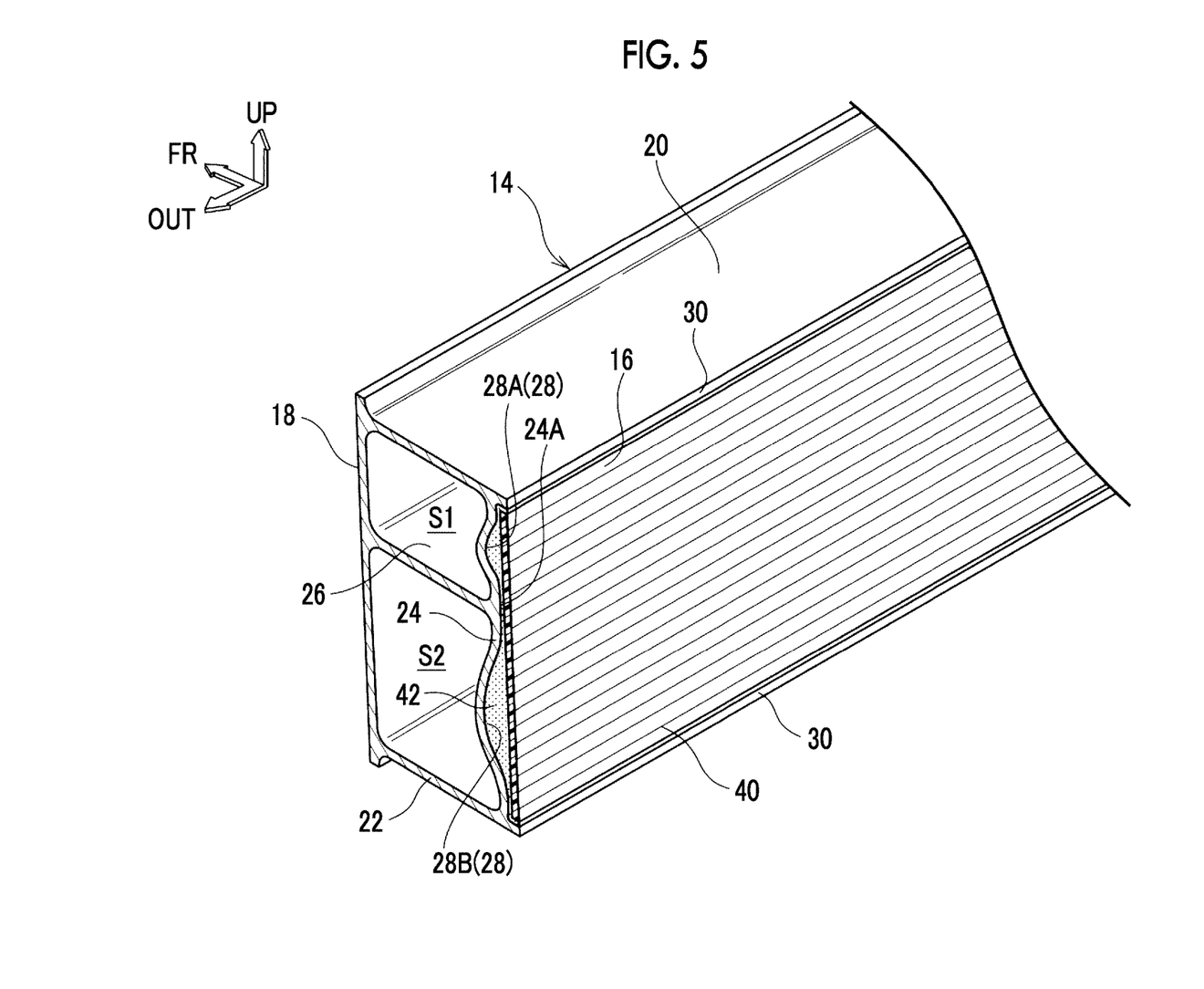
FIG. 5 is a perspective view illustrating a state where a part of the reinforcing material and the front bumper reinforcement having the vehicle body structure according to the first embodiment are seen from the rear side of the vehicle.

The reinforcing material 16 is formed by a fiber reinforced resin (for example, carbon fiber reinforced plastic (CFRP) and glass fiber reinforced plastic (GFRP) can be used). As illustrated in FIG. 5, the reinforcing material 16 is formed in a rectangular plate shape extending in the front-rear direction of the vehicle as its thickness direction and in the width direction of the vehicle as its longitudinal direction, In the present embodiment, a plurality of fibers (carbon fibers and glass fibers) 40 inside the reinforcing material 16 extends in one direction and the extension direction of the fibers 40 is substantially the same as the longitudinal direction of the reinforcing material 16 (the width direction of the vehicle). Although the reinforcing material 16 is formed in a plate shape, the shape of the reinforcing material 16 is not limited to the plate shape. The reinforcing material 16 may have the shape of a sheet as well. What is meant by "plate shape" is that the reinforcing material 16 is provided in the form of a rigid or semi-rigid plate. What is meant by "sheet shape" or "shape of a sheet" is that the reinforcing material 16 is provided in the form of a flexible sheet. In other words, the reinforcing material 16 is a reinforcing material layer that can be a rigid or semi-rigid plate or a flexible sheet. The fibers 40 strengthen the reinforcing material layer by making it difficult to stretch (lengthen) the reinforcing material layer in the direction(s) in which the fibers extend. In FIG. 5, the fibers 40 are schematically illustrated in a separate manner for easy understanding of the fibers 40.

As illustrated in FIG. 2, a vehicle front side surface 34 as one of the end faces of the reinforcing material 16 in the thickness direction of the reinforcing material 16 is bonded to the adhesive surface 24A via an adhesive 42. The first recessed portion 28A (between the first recessed portion 28A and the vehicle front side surface 34 of the reinforcing material 16) and the second recessed portion 28B (between the second recessed portion 28B and the vehicle front side surface 34 of the reinforcing material 16) are filled with the adhesive 42. The adhesive 42 is also disposed, with a certain thickness, on the portions of the adhesive surface 24A other than the first recessed portion 28A and the second recessed portion 28B.

Figure 3:
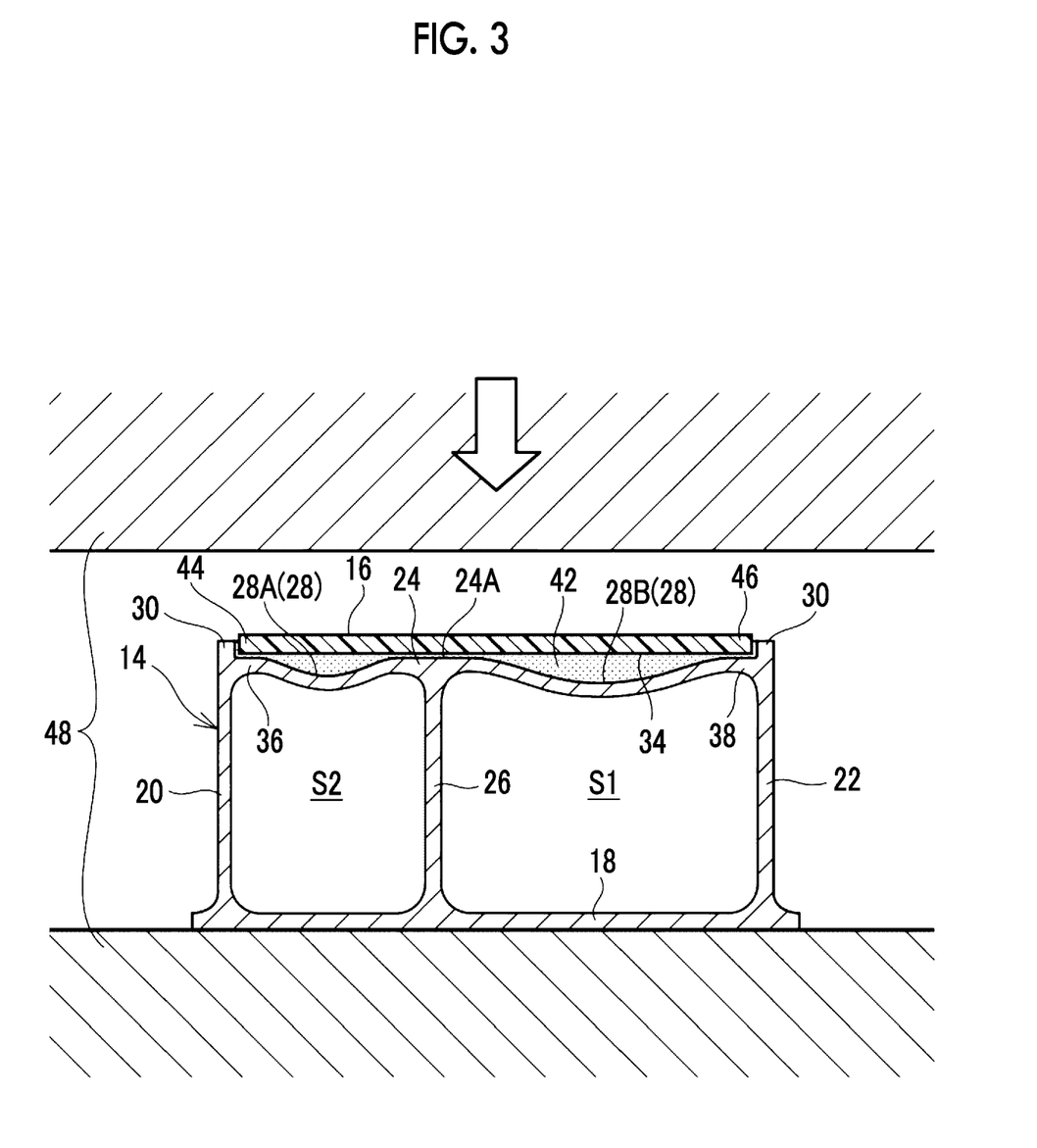
FIG. 3 is a schematic sectional view illustrating a state where a reinforcing material is attached to the front bumper reinforcement having the vehicle body structure according to the first embodiment.

An upper end portion 44 and a lower end portion 46 as the end faces of the reinforcing material 16 in the direction that intersects with the thickness direction of the reinforcing material 16 are disposed to face the end portion reinforcing portions 30 of the bumper R/F 14, respectively. The spaces between the upper and lower end portions 44, 46 and the end portion reinforcing portions 30 are filled with the adhesive 42 which is continuous from the space between the adhesive surface 24A and the vehicle front side surface 34 of the reinforcing material 16, As illustrated in FIG. 3, the reinforcing material 16 is bonded to the adhesive surface 24A by a pressurizing device 48 and hardened when attached to the adhesive surface 24A of the bumper R/F 14. In other words, the reinforcing material 16 is bonded to the adhesive surface 24A of the bumper R/F 14 in the direction toward the outer side of the vehicle from the inner side of the vehicle.

Action and Effect of First Embodiment

In the present embodiment, the vehicle front side surface 34 of the plate-shaped or sheet-shaped reinforcing material 16 that is formed of a fiber reinforced resin is bonded to the adhesive surface 24A of the metallic bumper R/F 14 that has a closed sectional structure as illustrated in FIG. 2. The recessed portion 28 is formed at a part of the adhesive surface 24A of the bumper R/F 14, the recessed portion 28 is recessed toward the side that is opposite to the vehicle front side surface 34 of the reinforcing material 16, and the adhesive 42 is disposed between the recessed portion 28 and the reinforcing material 16, Accordingly, the thickness of the adhesive 42 can be increased by the recessed portion 28, and thus peeling of the reinforcing material 16 from the bumper R/F 14 can be suppressed. Therefore, the reinforcing material 16 is capable of working effectively and the flexural capacity of the bumper R/F 14 including the reinforcing material 16 can be improved. As a result, the flexural capacity of the entire bumper R/F 14 that includes the plate-shaped or sheet-shaped reinforcing material 16 which reinforces the bumper R/F 14 can be improved.

The bumper R/F 14 is bent substantially toward the rear side of the vehicle when a collision load is input substantially from the front side of the vehicle to the bumper R/F 14 during a collision of the vehicle. In this case, a compressive force acts in the width direction of the vehicle on the part of the bumper R/F 14 that is closer to the front side of the vehicle than a neutral plane CP, and a tensile force acts in the width direction of the vehicle on the part of the bumper R/F 14 that is closer to the rear side of the vehicle than the neutral plane CR Since the reinforcing material 16 is bonded to the adhesive surface 24A of the bumper R/F 14, the proof strength with respect to the tensile force is improved at the part of the bumper R/F 14 that is closer to the rear side of the vehicle than the neutral plane CP and the deformation amount that is attributable to the tension decreases. In other words, the neutral plane CP, which is a boundary portion between a portion that is deformed by the compressive force and a portion that is deformed by the tensile force, is moved to the rear side of the vehicle (for example, to CP2 in the drawing) due to the reinforcing material 16. In other words, the reinforcing material 16 absorbs a large portion of the collision load, and thus the plate thicknesses of the rear wall portion 24 and the front wall portion 18 facing the rear wall portion 24 can be smaller than in a bumper R/F that is formed of an aluminum alloy and has almost the same level of flexural rigidity. As a result, the weight of the vehicle can be reduced.

Since the recessed portion 28 is filled with the adhesive 42, the thickness of the adhesive 42 can be reliably increased in the recessed portion 28, and thus peeling of the reinforcing material 16 from the bumper R/F 14 can be suppressed. Accordingly, the reinforcing material 16 is capable of working effectively and the flexural capacity of the bumper R/F 14 including the reinforcing material 16 can be improved. As a result, the flexural capacity of the entire bumper R/F 14 that includes the plate-shaped or sheet-shaped reinforcing material 16 which reinforces the bumper R/F 14 can be improved.

Figure 6A:
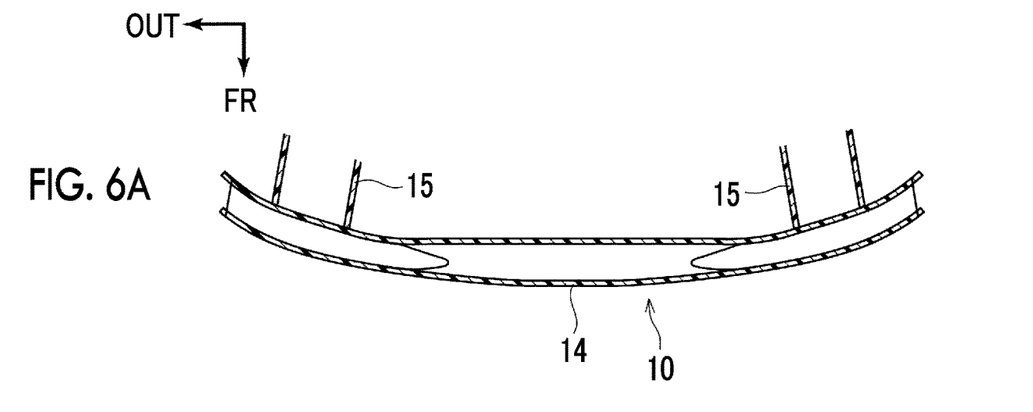
FIG. 6A is a schematic sectional view seen from above and illustrating a normal state of the front bumper reinforcement having the vehicle body structure according to the first embodiment.
Figure 6B:
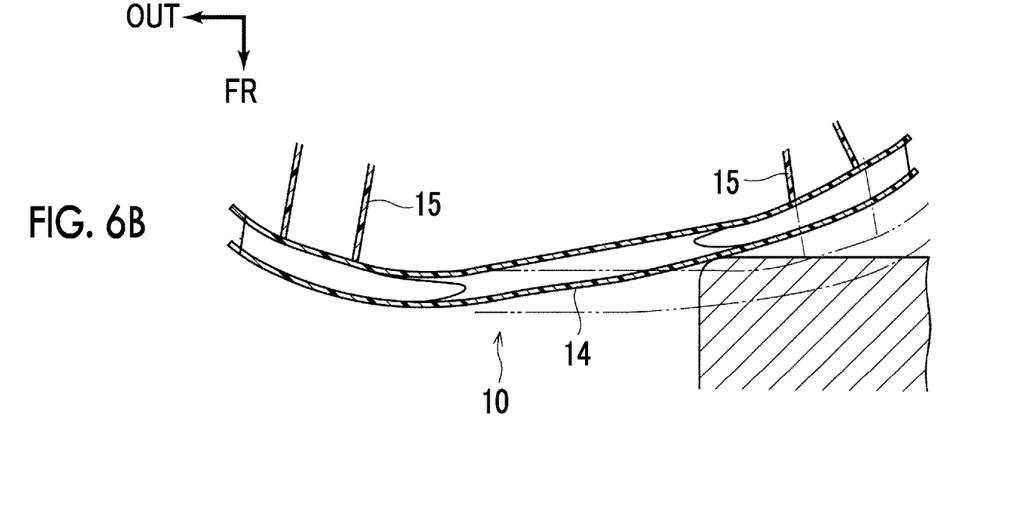
FIG. 6B is a schematic sectional view seen from above and illustrating an initial state of an offset collision of the front bumper reinforcement having the vehicle body structure according to the first embodiment.
Figure 6C:
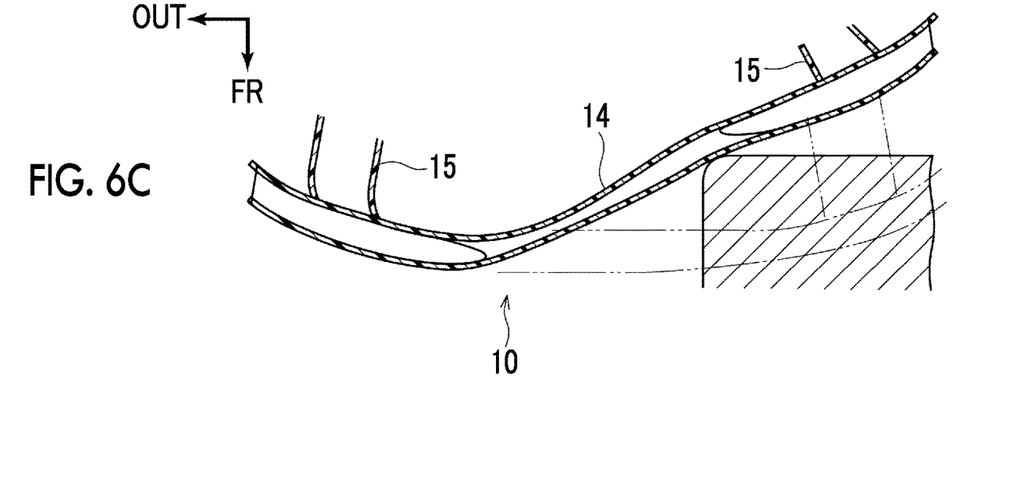
FIG. 6C is a schematic sectional view seen from above and illustrating a later state of the offset collision of the front bumper reinforcement having the vehicle body structure according to the first embodiment.

The bumper R/F 14 extends in the width direction of the vehicle and the recessed portion 28 is formed in a vehicle-width-direction outer side portion of the bumper R/F 14. Accordingly, once a collision load is input to one vehicle-width-direction outer side portion of the bumper R/F 14 by the vehicle that has the vehicle body structure 10 which is illustrated in FIG. 6A undergoing an offset collision as illustrated in FIG. 6B, the vehicle-width-direction outer side portion to which the collision load is input is deformed toward the rear side of the vehicle. In this case, the recessed portion 28 formed in the vehicle-width-direction outer side portion of the bumper R/F 14 is stretched and deformed into a substantially planar shape, and thus the collision load is absorbed by the deformation and the dimension of the adhesive surface 24A in the in-plane direction is enlarged with the deformation. As a result, breaking of the bumper R/F 14 as well as breaking of the adhesive surface 24A can be suppressed. Therefore, the collision load can be transmitted to the bumper R/F 14 on the side not undergoing the offset collision and to the crash box 15 on the side not undergoing the offset collision as well, as illustrated in FIG. 6C, and thus the collision load can be absorbed by the vehicle as a whole.

As illustrated in FIG. 4B, the recessed portion 28 has the first recessed portions 28A formed along the end portion 36 of the adhesive surface 24A and the second recessed portions 28B formed along the end portion 38 of the adhesive surface 24A and adjacent to the first recessed portions 28A. The first recessed portions 28A and the second recessed portions 28B are alternately disposed, Accordingly, at any position amongst the recessed portions 28, the reinforcing material 16 can be bonded to the bumper R/F 14 via at least one of the first recessed portions 28A and the second recessed portions 28B where the thickness of the adhesive 42 is increased.

The first recessed portions 28A are disposed at a predetermined pitch and the second recessed portions 28B are disposed at a pitch differing from the pitch of the first recessed portions 28A. Accordingly, the first recessed portions 28A and the second recessed portions 28B can be alternately disposed even in a case where the size of the first recessed portions 28A and the size of the second recessed portions 28B differ from each other. Therefore, at any position amongst the recessed portions 28, the reinforcing material 16 can be bonded to the bumper R/F 14 via at least one of the first recessed portions 28A and the second recessed portions 28B where the thickness of the adhesive 42 is increased. As a result, the flexural capacity of the entire bumper R/F 14 that includes the plate-shaped or sheet-shaped reinforcing material 16 which reinforces the bumper R/F 14 can be improved.

The adhesive surface 24A is disposed on the vehicle-inner-side surface of the bumper R/F 14 (vehicle-rear-side surface of the rear wall portion 24 of the bumper R/F 14) and the reinforcing material 16 is bonded to the adhesive surface 24A from the inner side of the vehicle toward the outer side of the vehicle. Accordingly, even in a case where a tensile force acts on the vehicle-inner-side surface of the bumper R/F 14 by a collision load directed from the outer side of the vehicle toward the inner side of the vehicle being input to the bumper R/F 14 during a collision of the vehicle, breaking of the vehicle-inner-side surface of the bumper R/F 14 can be suppressed by the reinforcing material 16, which is a high-rigidity member formed of a fiber reinforced resin. Therefore, the flexural capacity at a time of a vehicle collision of the entire bumper R/F 14 that includes the plate-shaped or sheet-shaped reinforcing material 16 which reinforces the bumper R/F 14 can be improved.

The depth of the recessed portion 28 with respect to the adhesive surface 24A is at least the deformation amount of the adhesive surface 24A in the direction perpendicular to the surface that is attributable to a thermal distortion of the bumper R/F 14, and thus the recessed portion 28 can be maintained even in a case where the bumper R/F 14 is deformed by the thermal distortion to the reinforcing material 16 side along the direction perpendicular to the surface of the adhesive surface 24A. Accordingly, the place where the adhesive 42 has a large thickness can be maintained. As a result, the effect of the thermal distortion on the adhesive strength of the reinforcing material 16 toward the bumper R/F 14 can be reduced.

The depth of the recessed portion 28 is set to 5 mm or less. Accordingly, a decline in the adhesive strength of the adhesive 42 attributable to an excessively thick adhesive layer can be suppressed. Therefore, a decline in the adhesive strength of the reinforcing material 16 toward the bumper R/F 14 can be suppressed.

Second Embodiment

Hereinafter, a vehicle body structure according to a second embodiment of the disclosure will be described. The same reference numerals will be used to refer to the components that are basically the same as in the first embodiment, and description thereof will be omitted.

Figure 7:
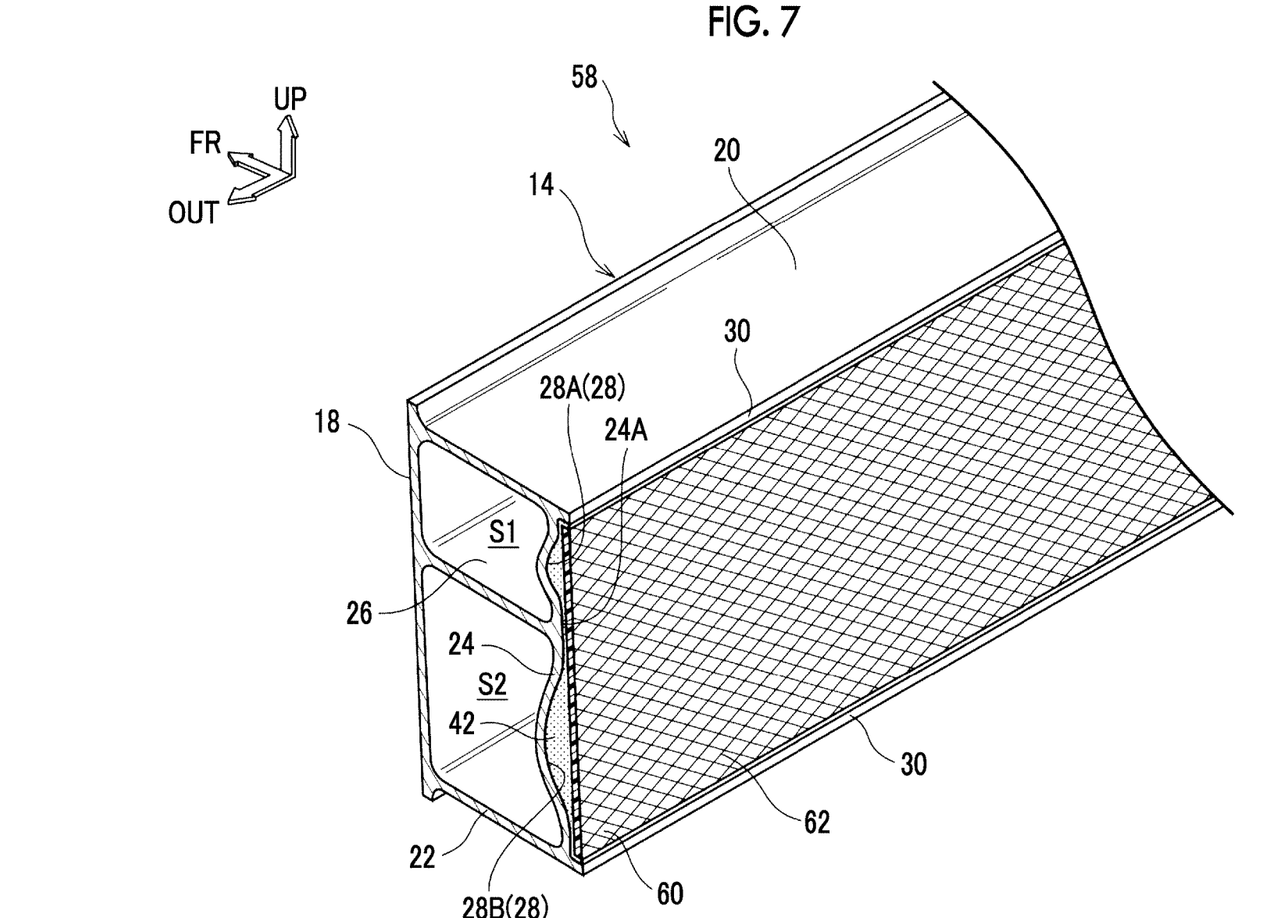
FIG. 7 is a perspective view illustrating a state where a part of a reinforcing material and a front bumper reinforcement having a vehicle body structure according to a second embodiment are seen from the rear side of a vehicle.

A vehicle body structure 58 according to the second embodiment has the same basic configuration as the vehicle body structure according to the first embodiment. In the vehicle body structure 58 according to the second embodiment, a plurality of fibers 62 inside a reinforcing material 60 extends in directions intersecting with each other.

In other words, the reinforcing material 60 is formed by a fiber reinforced resin (CFRP and GFRP) being used and the reinforcing material 60 is formed in a rectangular plate shape extending in the front-rear direction of the vehicle as its thickness direction and in the width direction of the vehicle as its longitudinal direction as illustrated in FIG. 7. In the present embodiment, the fibers (carbon fibers and glass fibers) 62 inside the reinforcing material 60 are arranged such that the fibers extending in the direction inclined to the lower side of the vehicle toward the vehicle-width-direction outer side and the fibers extending in the direction inclined to the upper side of the vehicle toward the vehicle-width-direction outer side intersect with each other. Although the reinforcing material 60 is formed in a plate shape, the shape of the reinforcing material 60 is not limited to the plate shape. The reinforcing material 60 may have the shape of a sheet as well. The fibers 62 are arranged such that the fibers are inclined with respect to the width direction of the vehicle and intersect with each other. However, the disclosure is not limited thereto. The fibers may also be arranged such that some of the fibers extend substantially in the width direction of the vehicle and some of the fibers extend substantially in the up-down direction of the vehicle so as to be substantially orthogonal to each other. In FIG. 7, the fibers 62 are schematically illustrated in a separate manner for easy understanding of the fibers 62.

Action and Effect of Second Embodiment

The action and effect of the present embodiment will be described below

The configuration of the vehicle body structure according to the second embodiment is identical to the configuration of the vehicle body structure according to the first embodiment except that the fibers 62 inside the reinforcing material 60 extend in the directions intersecting with each other. Accordingly, effects similar to the effects achieved with the first embodiment can be achieved with the second embodiment.

The fibers 62 of the fiber reinforced resin that forms the reinforcing material 60 extend in the directions intersecting with each other, and thus the flexural rigidity of the fiber reinforced resin with respect to inputs from various directions is improved. Accordingly, the flexural rigidity of the bumper R/F 14 to which the reinforcing material 60 formed of the fiber reinforced resin is bonded is improved with respect to inputs from various directions, and thus sectional deformation can be suppressed. As a result, the flexural capacity of the entire bumper R/F 14 that includes the plate-shaped or sheet-shaped reinforcing material 60 which reinforces the bumper R/F 14 can be improved.

In the first and second embodiments described above, the reinforcing material 16, 60 is bonded to the bumper R/F 14. However, the disclosure is not limited thereto. For example, the reinforcing material 16, 60 may also be applied to another vehicle skeleton member such as a rocker (not illustrated) and a vehicle pillar (not illustrated). The vehicle pillar to which the reinforcing material 16, 60 is applied may be any one of a front pillar, a center pillar, a rear pillar, and a quarter pillar. In this case, the rocker and the vehicle pillar are deformed to the inner side in the width direction of the vehicle once a collision load is input to the rocker and the vehicle pillar during a vehicle side collision. In this case, the recessed portion is stretched into a substantially planar shape, and thus the dimension of the adhesive surface 24A in the in-plane direction is enlarged and breaking of the rocker and the vehicle pillar as well as breaking of the adhesive surface 24A can be suppressed. Therefore, the collision load can be absorbed by the rocker and the vehicle pillar.

The first recessed portion 28A and the second recessed portion 28B of the recessed portion 28 do not overlap each other in the up-down direction of the vehicle. However, the disclosure is not limited thereto. For example, the first recessed portion 28A and the second recessed portion 28B of the recessed portion 28 may overlap each other in the up-down direction of the vehicle. The first recessed portions 28A are disposed at a predetermined pitch and the second recessed portions 28B are disposed at a pitch differing from the pitch of the first recessed portions 28A. However, the disclosure is not limited thereto. For example, the first recessed portions 28A and the second recessed portions 28B May be disposed at the same pitch insofar as the first recessed portions 28A and the second recessed portions 28B alternate with each other. The first recessed portions 28A and the second recessed portions 28B are alternately disposed. However, the disclosure is not limited thereto. Any other disposition such as disposition on the same vertical line may be adopted for the first recessed portions 28A and the second recessed portions 28B. The recessed shapes of the two types of recessed portions, one being the first recessed portion 28A and the other being the second recessed portion 28B, constitute the recessed portion 28. However, the disclosure is not limited thereto. The recessed portion 28 may be made up of one common recessed shape or three or more different recessed shapes as well.

The first recessed portion 28A and the second recessed portion 28B are filled with the adhesive 42. However, the disclosure is not limited thereto. For example, the adhesive 42 may also be partially disposed in the first recessed portion 28A and the second recessed portion 28B.

The recessed portion. 28 is disposed in the vehicle-width-direction outer side portion of the bumper R/F 14, However, the disclosure is not limited thereto. The recessed portion 28 may also be formed at other positions or formed substantially over the entire bumper R/F 14. The reinforcing material 16, 60 is disposed on the vehicle-inner-side surface of the bumper R/F 14. However, the disclosure is not limited thereto. The reinforcing material 16, 60 may also be disposed at another position such as a vehicle-outer-side surfaces of the bumper R/F 14.

The disclosure is not limited to the embodiments described above. It is a matter of course that the disclosure can be modified in various ways without departing from the scope of the disclosure.

What is claimed is:

1. A vehicle body structure comprising:
  a vehicle skeleton member having a closed sectional structure, the vehicle skeleton member formed of metal, a portion of an outer surface of the vehicle skeleton member having a recessed portion recessed toward an inside of the closed sectional structure; and
  a reinforcing material layer formed of a fiber reinforced resin,
  wherein an adhesive is disposed at least between the recessed portion and the reinforcing material layer so that the reinforcing material layer is adhered to at least the portion of the outer surface of the vehicle skeleton member having the recessed portion, wherein
    the vehicle skeleton member is elongated in a first direction, the portion of the outer surface of the vehicle skeleton member having the recessed portion extends in the first direction and has first and second end portions disposed adjacent to each other in a direction orthogonal to the first direction, the recessed portion has a plurality of first recessed portions formed along the first end portion and a plurality of second recessed portions formed along the second end portion, and the first recessed portions and the second recessed portions are alternately disposed relative to the first direction.

2. The vehicle body structure according to claim 1, wherein the adhesive fills the recessed portion.

3. The vehicle body structure according to claim 1, wherein the adhesive is partially disposed in the recessed portion.

4. The vehicle body structure according to claim 1, wherein:

the vehicle skeleton member is a bumper reinforcement extending in a width direction of a vehicle; and the recessed portion is formed in a vehicle-inward-facing surface of the bumper reinforcement at least at vehicle-width-direction end portions of the bumper reinforcement.

5. The vehicle body structure according to claim 1, wherein:

the first recessed portions are disposed at a predetermined pitch, and the second recessed portions are disposed at a pitch differing from the predetermined pitch of the first recessed portions.

6. The vehicle body structure according to claim 1, wherein:

the portion of the outer surface of the vehicle skeleton member having the recessed portion is disposed on a vehicle-inner-side-facing surface of the vehicle skeleton member; and the reinforcing material layer is bonded to the portion of the outer surface of the vehicle skeleton member having the recessed portion from an inner side of the vehicle.

7. The vehicle body structure according to claim 1, wherein fibers of the fiber reinforced resin forming the reinforcing material layer extend in directions intersecting with each other.

8. The vehicle body structure according to claim 1, wherein a depth of the recessed portion is at least a deformation amount of the portion of the outer surface of the vehicle skeleton member having the recessed portion in a direction perpendicular to the outer surface that is attributable to a thermal distortion of the vehicle skeleton member.

9. The vehicle body structure according to claim 1, wherein a depth of the recessed portion is 5 mm or less.

10. A vehicle body structure comprising:

a metal hollow tubular vehicle skeleton member having a closed sectional structure and that is elongated in a first direction, the vehicle skeleton member having a surface that includes a plurality of concave recesses;

a reinforcing material layer formed of a fiber reinforced resin; and an adhesive by which the reinforcing material layer is attached to the surface of the vehicle skeleton member, the adhesive disposed at least between the reinforcing material layer and the plurality of concave recesses, wherein:

the surface of the vehicle skeleton member having the concave recesses extends in the first direction and has first and second end portions disposed adjacent to each other in a direction orthogonal to the first direction, the plurality of concave recesses includes a plurality of first concave recesses formed along the first end portion and a plurality of second concave recesses formed along the second end portion, and the first concave recesses and the second concave recesses are alternately disposed relative to the first direction.

11. The vehicle body structure according to claim 10, wherein the surface of the vehicle skeleton member that includes the plurality of concave recesses is an outer surface of the vehicle skeleton member, and the plurality of concave recesses protrude toward an inside of the vehicle skeleton member.

12. The vehicle body structure according to claim 10, wherein the surface of the vehicle skeleton member that includes the plurality of concave recesses is a substantially planar surface.

13. The vehicle body structure according to claim 10, wherein the plurality of concave recesses have different sizes.

14. The vehicle body structure according to claim 10, wherein the plurality of concave recesses are arranged in multiple rows.

15. The vehicle body structure according to claim 10, wherein the adhesive also is located between the reinforcing material layer and portions of the surface of the vehicle skeleton member between the plurality of concave recesses.

16. The vehicle body structure according to claim 10, wherein the plurality of concave recesses are located at opposite ends, in the first direction, of the vehicle skeleton member.

17. The vehicle body structure according to claim 10, wherein:

the first concave recesses are disposed at a predetermined pitch, and the second concave recesses are disposed at a pitch differing from the predetermined pitch of the first concave recesses.

18. The vehicle body structure according to claim 10, wherein fibers of the fiber reinforced resin forming the reinforcing material layer extend in directions intersecting with each other.

* * * * *